(12) United States Patent
Okazaki et al.

(10) Patent No.: US 12,183,374 B1
(45) Date of Patent: Dec. 31, 2024

(54) VARYING SUSPENSION ARM LENGTH FOR MAGNETIC STORAGE DEVICE

(71) Applicant: Western Digital Technologies, Inc., San Jose, CA (US)

(72) Inventors: Toshihisa Okazaki, Fujisawa (JP); Andrew Hanlon, San Jose, CA (US); Haruhide Takahashi, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/410,727

(22) Filed: Jan. 11, 2024

(51) Int. Cl.
*G11B 5/54* (2006.01)
*G11B 5/48* (2006.01)
*G11B 5/55* (2006.01)

(52) U.S. Cl.
CPC ..................... *G11B 5/553* (2013.01)

(58) Field of Classification Search
CPC ... G11B 5/4813; G11B 5/4833; G11B 5/4826; G11B 5/40; G11B 5/1272; G11B 5/3906; G11B 5/6082; G11B 2005/0021; G11B 2220/2516; G06F 3/0676
USPC .......................................... 360/266.1, 245.4
See application file for complete search history.

(56) References Cited

U.S. PATENT DOCUMENTS

| | | | |
|---|---|---|---|
| 7,031,103 B2 * | 4/2006 | Yoo | G11B 33/08 |
| 7,085,104 B1 | 8/2006 | Hadian et al. | |
| 7,952,835 B2 | 5/2011 | Lee et al. | |
| 2004/0066585 A1 | 4/2004 | Shum | |
| 2011/0090599 A1 | 4/2011 | Feng et al. | |
| 2012/0314548 A1 | 12/2012 | Siegler et al. | |

FOREIGN PATENT DOCUMENTS

| | | |
|---|---|---|
| WO | 1997035302 | 9/1997 |
| WO | 1999009555 | 2/1999 |
| WO | 2021183663 | 9/2021 |

OTHER PUBLICATIONS

Pan et al., On optimal design of HDD suspension using topology optimization, Microsystem Technologies, Mar. 29, 2002, pp. 137-146, vol. 9, copyright Springer-Verlag.

* cited by examiner

*Primary Examiner* — Nabil Z Hindi
(74) *Attorney, Agent, or Firm* — Kunzler Bean & Adamson

(57) ABSTRACT

Disclosed herein is a magnetic storage device that includes magnetic storage discs and a first carriage arm rotatably movable in a radial direction along a first one of the magnetic storage discs and within a region radially outward from the first one of the magnetic discs. The magnetic storage device includes a first suspension arm co-movably fixed to the first carriage arm and having a first-suspension-arm length extending from a proximate first-suspension-arm end of the first suspension arm to a distal first-suspension-arm end of the first suspension arm. The magnetic storage device also includes a second suspension arm co-movably fixed to the first carriage arm and having a second-suspension arm length extending from a proximate second-suspension arm end to a distal second-suspension arm end of the second suspension arm that is different from the first-suspension arm length.

20 Claims, 8 Drawing Sheets

VARYING SUSPENSION ARM LENGTH FOR MAGNETIC STORAGE DEVICE

FIELD

This disclosure relates generally to magnetic storage devices, and more particularly to improving storage capacities of magnetic storage devices by reducing the space between magnetic storage discs and increasing the number of discs within the magnetic storage devices.

BACKGROUND

Magnetic storage devices, such as hard disc drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic discs. Read-write heads can be offloaded from the discs and onto ramp supports when not reading data from or writing data to the discs.

One way to increase the storage capacity of an HDD is to increase the number of discs within the HDD. However, the components necessary to move and offload the read-write heads can spatially constrain the discs and limit the ability to increase the number of discs within the HDD.

SUMMARY

The subject matter of the present application has been developed in response to the present state of magnetic storage device are, and in particular, in response to the shortcomings of magnetic storage devices that have not yet been fully solved by currently available magnetic storage devices. Accordingly, the embodiments of the present disclosure overcome at least some of the shortcomings of the prior art.

Disclosed herein is a magnetic storage device that includes magnetic storage discs. The magnetic storage device also includes a carriage. The carriage includes a first carriage arm rotatably movable in a radial direction along a first one of the magnetic storage discs and within a region radially outward from the first one of the magnetic discs. The carriage includes a first read-write head assembly, which includes a first suspension arm co-movably fixed to the first carriage arm and having a first-suspension-arm length extending from a proximate first-suspension-arm end of the first suspension arm to a distal first-suspension-arm end of the first suspension arm. The proximate first-suspension-arm end is coupled to a distal end of the first carriage arm. The first read-write head assembly includes a first read-write head co-movably fixed to the first suspension arm and facing the first one of the magnetic discs. The carriage also includes a second read-write head assembly. The second read-write head assembly includes a second suspension arm co-movably fixed to the first carriage arm and having a second-suspension arm length extending from a proximate second-suspension arm end to a distal second-suspension arm end of the second suspension arm that is different from the first-suspension arm length. The proximate second-suspension arm end is coupled to the distal end of the first carriage arm. The second read-write head assembly includes a second read-write head co-movably fixed to the second suspension arm and facing the second one of the magnetic discs. The magnetic storage device includes a ramp support. The ramp support includes a first ramp located to receive the distal-first-suspension-arm end when the distal-first-suspension-arm end is moved within the region and away from the magnetic discs and a second ramp offset from the first ramp in a circumferential direction along a circumference of the first one of the discs and located to receive the distal-second-suspension-arm end when the distal-second-suspension-arm end is moved within the region and away from the magnetic discs. The distal-first-suspension-arm end and the distal-second-suspension-arm end intersect or pass through a first plane bifurcating the space between the first disc and the second disc and being parallel to the discs when the distal-first-suspension-arm end and the distal-second-suspension-arm end move onto the ramp support. The preceding subject matter of this paragraph characterizes example 1 of the present disclosure.

In some examples, the first plane passes through a first-ramp portion of the first ramp and a second-ramp portion of the second ramp. The preceding subject matter of this paragraph characterizes example 2 of the present disclosure, wherein example 2 also includes the subject matter according to example 1, above.

In some examples, the first ramp includes a first-ramp surface that contacts the first suspension arm when the first carriage arm is moved radially outward from the disc. In some examples, the second ramp includes a second-ramp surface that contacts the second suspension arm when the first carriage arm is moved radially outward from the disc. The first-ramp surface and the second-ramp surface are consecutive ramp surfaces of the ramp support, in a direction perpendicular to the plane. The preceding subject matter of this paragraph characterizes example 3 of the present disclosure, wherein example 3 also includes the subject matter according to example 2, above.

In some examples, the magnetic storage device includes a swage ball connecting the proximate first-suspension-arm end of the first read-write head assembly to the first carriage arm and connecting the proximate second-suspension-arm end of the second read-write head assembly to the first carriage arm. The preceding subject matter of this paragraph characterizes example 4 of the present disclosure, wherein example 4 also includes the subject matter according to any of examples 1-3, above.

In some examples, the ramp support further includes a third ramp aligned with the first ramp in a direction perpendicular to the first plane such that both the first and third ramps are offset from each other in a circumferential direction along a circumference of a third one of the discs. The preceding subject matter of this paragraph characterizes example 5 of the present disclosure, wherein example 5 also includes the subject matter according to any of examples 1-4, above.

In some examples, the second-suspension arm length is less than the first-suspension arm length, and the proximate first-suspension arm end is aligned with the proximate second-suspension-arm end in a direction perpendicular to the first plane. The preceding subject matter of this paragraph characterizes example 6 of the present disclosure, wherein example 6 also includes the subject matter according to any of examples 1-5, above.

In some examples, a ratio of the second-suspension arm length to the first-suspension arm length is between, and inclusive of, 1 and 2. The preceding subject matter of this paragraph characterizes example 7 of the present disclosure, wherein example 7 also includes the subject matter according to any of examples 1-6, above.

In some examples, each of the first suspension arm and the second suspension arm extend at angles relative to the first plane. The preceding subject matter of this paragraph characterizes example 8 of the present disclosure, wherein example 8 also includes the subject matter according to any of examples 1-7, above.

In some examples, the first suspension arm includes a receptacle. The distal second-suspension arm end moves into the receptacle as the first carriage arm moves away from the second disc and the second suspension arm slides along a ramp surface of the second ramp. The preceding subject matter of this paragraph characterizes example 9 of the present disclosure, wherein example 9 also includes the subject matter according to any of examples 1-8 above.

In some examples, the carriage includes a second carriage arm and a third read-write head assembly. The third read-write head assembly includes a third suspension arm co-movably fixed to the second carriage arm and having a third-suspension arm length extending from a proximate third-suspension-arm end of the third suspension arm to a distal third-suspension-arm end. The proximate third-suspension arm end is coupled to a distal end of the second carriage arm. The third read-write head assembly includes a third read-write head co-movably fixed to the third suspension arm and facing the second one of the magnetic discs. The carriage includes a fourth suspension arm co-movably fixed to the second carriage arm and having a fourth-suspension arm length extending from a proximate fourth-suspension-arm end to a distal fourth-suspension-arm end that is different from the third-suspension arm length. The proximate fourth-suspension-arm end is coupled to the distal end of the second carriage arm. The fourth read-write head assembly includes a fourth read-write head co-movably fixed to the fourth suspension arm and facing a third one of the magnetic discs. The preceding subject matter of this paragraph characterizes example 10 of the present disclosure, wherein example 10 also includes the subject matter according to any one of examples 1-10, above.

In some examples, the magnetic storage device includes at least eleven magnetic discs. The preceding subject matter of this paragraph characterizes example 11 of the present disclosure, wherein example 11 also includes the subject matter according to any one of examples 1-10, above.

In some examples, a lateral distance between an axis of rotation of the magnetic discs and the first read-write head is greater than a lateral distance between the axis of rotation and the second read-write head. The preceding subject matter of this paragraph characterizes example 12 of the present disclosure, wherein example 12 also includes the subject matter according to any one of examples 1-11, above.

In some examples, a distance, in a direction substantially parallel to an axis of rotation of the magnetic discs, between the first disc of the magnetic disc and the second disc of the magnetic discs, is less than or equal to 1.55 centimeters ("cm"). The preceding subject matter of this paragraph characterizes example 13 of the present disclosure, wherein example 13 also includes the subject matter according to any one of examples 1-12, above.

In some examples, the first ramp includes a first first-ramp surface configured to contact the first read-write head assembly when the first carriage arm is rotated radially outward from the disc. The first ramp also includes a second first-ramp surface opposite to the first first-ramp surface. A distance, in the direction, between the second first-ramp surface and a second-disc surface of the second disc is greater than or equal to half of a distance, in the direction, between the second-disc surface and a first disc surface of the first disc facing the second-disc surface. The preceding subject matter of this paragraph characterizes example 14 of the present disclosure, wherein example 14 also includes the subject matter according to example 13, above.

In some examples, the first first-ramp surface includes a first point of contact between the first read-write head assembly and the first first-ramp surface when the first carriage arm is rotated radially outward from the discs. A distance between the first point of the contact and the second-disc surface is not less than 0.1 cm. The preceding subject matter of this paragraph characterizes example 15 of the present disclosure, wherein example 15 also includes the subject matter of example 14, above.

In some examples, the first ramp further comprises a third first-ramp surface connected to the first-ramp surface at a second point of contact. A distance, in the direction, between the second point of contact and the first point of contact, is not less than 0.2 cm. The first first-ramp surface is angled with respect to the third first-ramp surface and the second first-ramp surface. The preceding subject matter of this paragraph characterizes example 16 of the present disclosure, wherein example 16 also includes the subject matter according to example 15, above.

Examples of the present disclosure include a carriage for a magnetic storage device. The carriage includes a first carriage arm and a first read-write head assembly. The first read-write head assembly includes a first suspension arm co-movably fixed to the first carriage arm and having a first-suspension-arm length extending from a proximate first-suspension-arm end of the first suspension arm to a distal first-suspension-arm end of the first suspension arm. The proximate first-suspension-arm end is coupled to a distal end of the first carriage arm. The first read-write head assembly includes a first read-write head co-movably fixed to the first suspension arm and coupled to the distal first-suspension-arm end. The carriage also includes a second read-write head assembly. The second read-write head assembly includes a second suspension arm co-movably fixed to the first carriage arm and having a second-suspension arm length extending from a proximate second-suspension arm end to a distal second-suspension arm end of the second suspension arm that is different from the first-suspension arm length. The proximate second-suspension arm end is coupled to the distal end of the first carriage arm. The second read-write head assembly includes a second read-write head co-movably fixed to the second suspension arm. The preceding subject matter of this paragraph characterizes example 17 of the present disclosure.

Additionally disclosed herein is a method of using a magnetic storage device. The method includes rotating a first carriage arm radially outward from a first magnetic disc and toward a ramp support. Rotating the carriage arm radially outward from the magnetic disc causes a first suspension arm co-movably fixed to the first carriage arm and having a first-suspension arm length extending from a proximate first-suspension-arm end of the first suspension arm to a distal first-suspension-arm end of the first suspension arm to move toward and contact a first-ramp surface of a first ramp of the ramp support and to move along the first-ramp surface until the distal first-suspension-arm end intersects a first plane between the proximate first-suspension-arm end and a proximate second-suspension-arm end of a second read-write head assembly. Rotating the carriage arm also causes a second suspension arm of the second read-write head assembly to move toward and contact a second-ramp surface of a second ramp of the ramp support. The second suspension arm is co-movably fixed to the first carriage arm and has a second-suspension arm length extending from a proximate second-suspension arm end to a distal second-suspension arm end of the second suspension arm different from the first-suspension arm to length. The preceding subject matter of this paragraph characterizes example 18 of the present disclosure.

In some examples, rotating the first carriage arm further causes the distal first-suspension arm end to move, in a direction substantially parallel to an axis of rotation of the first carriage arm, from a first side of the distal second-suspension arm end to a second side of the distal second-suspension arm end opposite to the first side. The preceding subject matter of this paragraph characterizes example 19 of the present disclosure, wherein example 19 also includes the subject matter according to example 18, above.

In some examples, rotating the first carriage arm further causes each of the distal-first-suspension-arm end and the distal-second-suspension-arm end to intersect or pass through a first plane bifurcating a space between the first disc and a second disc. The preceding subject matter of this paragraph characterizes example 20 of the present disclosure, wherein example 20 also includes the subject matter according to any one of examples 18 or 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

Figure 6:
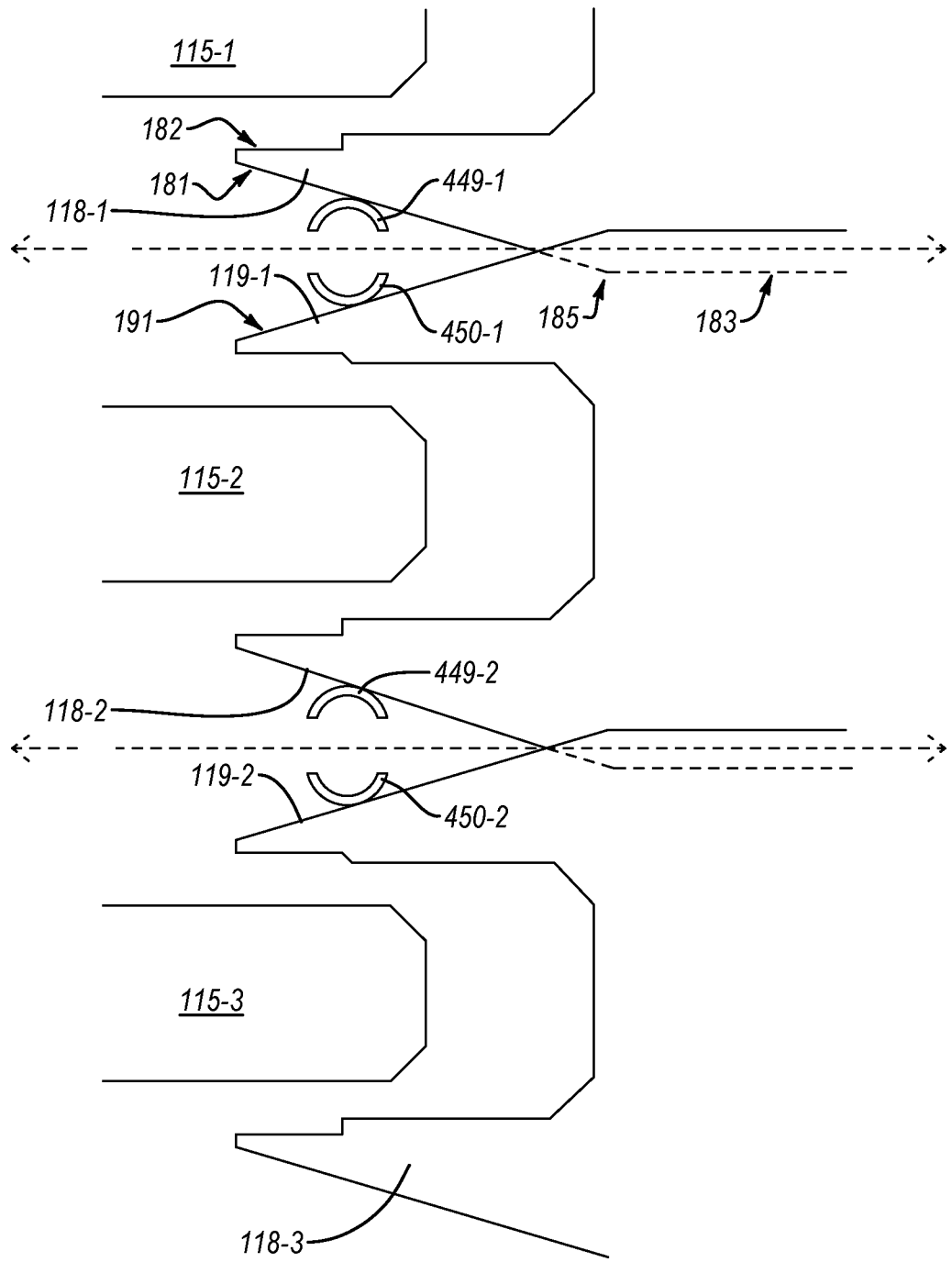
Figure 7:
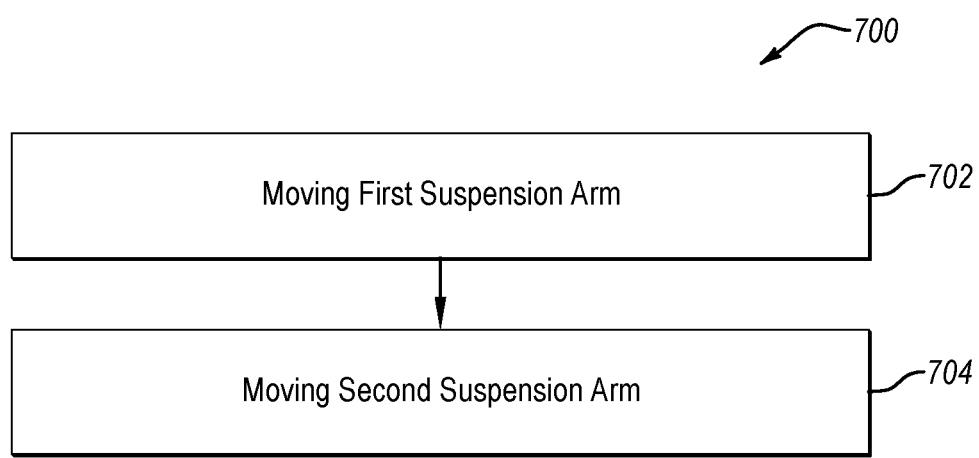

5B is a cross-sectional side elevation view of a ramp support of a magnetic storage device, shown with the read-write head assembly in a loaded position relative to the ramp support as the read-write head assembly is offloaded from a disc of the magnetic storage device, according to one or more examples of the present disclosure;

FIG. 6 is a cross-sectional side elevation view of a ramp support of a magnetic storage device having at least three ramps, according to one or more examples of the present disclosure; and FIG. 7 is a schematic flow chart of a method of loading two or more suspension arms of a magnetic storage device onto a ramp support, according to one or more examples of the present disclosure.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
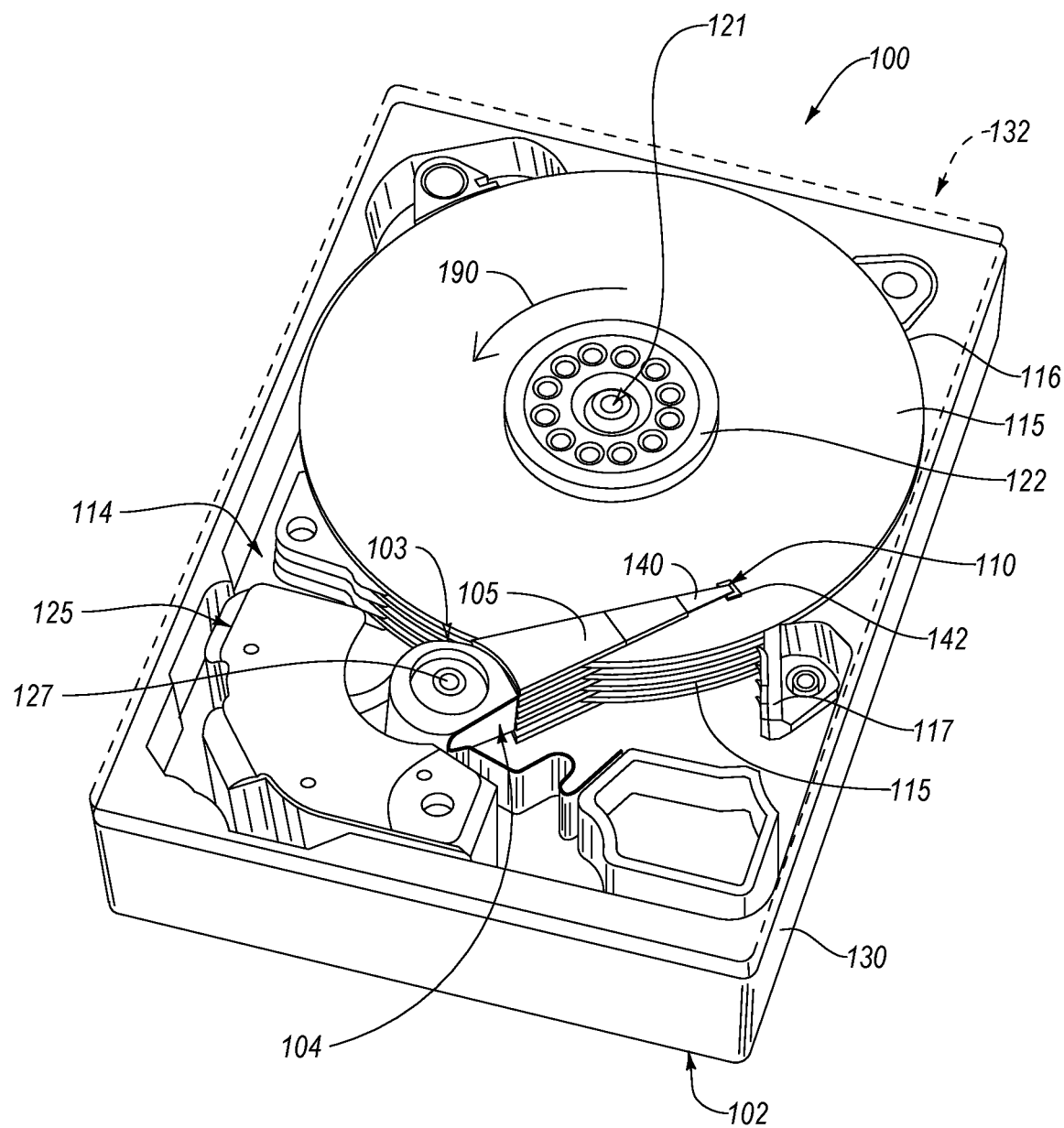
FIG. 1 is a perspective view of a magnetic storage device, according to one or more examples of the present disclosure.

Referring to FIG. 1, a magnetic storage device 100, according to one embodiment, is depicted as a hard disc drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132.

The magnetic storage device 100 includes various features located within the interior cavity 114 of the housing 102. In some embodiments, the magnetic storage device 100 includes a carriage 103, discs 115, a spindle motor 121, and a voice coil magnetic (VCM) actuator 125 within the interior cavity 114. The carriage 103 includes a plurality of carriage arms 105-1, 105-2 (referred to herein, individually and/or collectively, as "105") and at least one read-write head assembly 110-1, . . . , 110-4 (referred to herein, individually and/or collectively, as "110") coupled to the distal tip of each arm of the plurality of carriage arms 105. In the illustrated embodiment of FIG. 4A, two read-write head assemblies 110 are coupled to the distal tip of each carriage arm 105 that extends between adjacent discs 115, and only one read-write head assembly is coupled to the distal tip of the two carriage arms 105 on either side of the stack of discs 115. Each read-write head assembly 110 includes a suspension arm 140, a slider 142, and at least one read-write head (see, e.g., read-write head 148 of FIG. 3). Although not shown, each read-write head assembly 110 can include at least one gimbal. The gimbal movably couples the suspension arm 140, the slider 142, and the at least one read-write head 148 to a corresponding one of the carriage arms 105. Although the magnetic storage device 100 is shown to have five carriage arms 105 and four discs 115 in the embodiment of FIG. 1 and nine carriage arms 105 and eight discs 115 in the embodiment of FIG. 2, in other embodiments the magnetic storage device 100 can have fewer than five carriage arms 105, fewer than four discs 115, more than nine carriage arms 105, more than eight discs 115, between 6-8 carriage arms 105, or between 5-7 discs 115. In some examples, each side of each carriage arm 105 facing a disc 115 has a read-write head assembly 110 (e.g., in FIG. 2A, each of bottom and top carriage arms 105 has one read-write head assembly 110 and each of middle carriage arms 105, between the bottom and top carriage arms 105, has two read-write head assemblies 110). Similarly, although the magnetic storage device 100 is shown to have one spindle motor 121 and one VCM actuator 125, in other embodiments, the magnetic storage device 100 can have any number of spindle motors 121 and VCM actuators 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The discs 115, or platters, are co-rotatably fixed to the spindle of the spindle motor 121 via respective hubs 122, which are co-rotatably secured to respective discs 115 and the spindle. As the spindle of the spindle motor 121 rotates, the discs 115 correspondingly rotate. In this manner, the spindle of the spindle motor 121 defines a rotational axis of each disc 115. The spindle motor 121 can be operatively controlled to rotate the discs 115, in a rotational direction 190, a controlled amount at a controlled rate.

Each of the discs 115 may be any of various types of magnetic recording media. Generally, in one embodiment, each disc 115 includes a substrate and a magnetic material applied directly or indirectly onto the substrate. For example, the magnetic material of the discs 115 may be conventional granular magnetic recording discs or wafers that have magnetic layer bits with multiple magnetic grains on each bit. In granular magnetic media, all of the bits are co-planar and the surface 116 of the disc is substantially smooth and continuous. In one embodiment, each bit has a magnetic dipole moment that can either have an in-plane (longitudinal) orientation or an out-of-plane (perpendicular) orientation.

As the discs 115 rotate in a read-write mode, the VCM actuator 125 electromagnetically engages voice coils of the carriage arms 105 to rotate the carriage arms 105, and the read-write head assemblies 110, which are coupled to the carriage arms 105, relative to the discs 115 in a rotational direction along a plane parallel to read-write surfaces 154 of the discs 115 (e.g., plane 'A'). The carriage arms 105 can be rotated to position the read-write head 148 of the read-write head assemblies 110 over a specified radial area of the read-write surface 154 of a corresponding disc 115 for read and/or write operations. The VCM actuator 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM actuator 125.

The carriage arms 105 are non-movably fixed to and extend away from a base of the carriage 103 in a spaced-apart manner relative to each other. In some implementations, the carriage arms 105 are spaced an equi-distance apart from each other and extend parallel relative to each other. A respective one of the discs 115 is positioned between adjacent carriage arms 105. In an idle mode (e.g., when read-write operations are not being performed), the VCM actuator 125 is actuated to rotate the carriage arms 105, in a radially outward direction relative to the discs 15, such that the read-write head assemblies 110 are parked or unloaded onto a ramp support 117 secured to the base 130.

Each read-write head 148 includes at least one read transducer and at least one write transducer. The read transducer is configured to detect magnetic properties (e.g., magnetic bit patterns) of a disc 115 and convert the magnetic properties into an electrical signal. In contrast, the write transducer changes the magnetic properties of a disc 115 responsive to an electrical signal. For each read-write head assembly 110, the electrical signals are transmitted from and to the read-write head 148 via electrical traces or lines formed in or coupled to the slider 142, suspension arm 140, and carriage arm 105. The electrical traces of the slider 142, suspension arm 140, and carriage arm 105 are electrically interconnected to facilitate transmission of electrical signals between the read-write head 148 and a flex connector 104 of the magnetic storage device 100, which is in communication with a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. Solder weldments are utilized to electrically connect corresponding electrical contact pads (and corresponding electrical traces) of the slider 142 and the suspension arm 140.

Although not shown, the read-write head assembly 110 also includes a head actuator selectively operable to move the read-write head 148 relative to the carriage arm 105. The head actuator selectively moves the read-write head 148 in any of various manners and in any of various directions. For example, the head actuator can be configured to move the read-write head 148 linearly in any of various directions, such as in one or more of a first sideways direction, a second sideways direction, a forward direction, and a backward direction, along a plane parallel to the read-write surface 154 of the disc 115 (e.g., plane 'A'). As another example, the head actuator may be, alternatively or additionally, configured to move the read-write head 148 linearly in any of various directions, such as an upward direction and a downward direction, along a plane perpendicular to the read-write surface 154 of the disc 115 (e.g., plane 'B'). Further, in some implementations, the head actuator may be, alternatively or additionally, configured to move the read-write head 148 rotationally in any of various rotational directions along planes parallel to and/or perpendicular to the read-write surface 154 of the disc 115. The head actuator can be any of various actuators known in the art, such as, for example, so-called electrically-controlled micro-actuators and milli-actuators (e.g., piezo-electric actuators).

The suspension arm 140 of the read-write head assembly 110 is softer and more flexible than the carriage arm 105 to promote resilient support of the slider 142 relative to the carriage arm 105. For example, in some implementations, the suspension arm 140 is flexible to flex away from the read-write surface 154 of the disc 115 to allow the slider 142 move away from the read-write surface 154 of the disc 115, such as when an air bearing is formed between the read-write surface 154 and the slider 142 as the disc 115 spins relative to the read-write head assembly 110. The suspension arm 140 can have a generally thin, sheet-like, construction and taper from carriage arm 105 to the slider 142. In some examples, the slider 142 is coupled to a distal end portion of the suspension arm 140 such that the suspension arm 140 is positioned between or separates the slider 142 from the carriage arm 105. In this manner, the slider 142 is distally spaced apart from the carriage arm 105 via the suspension arm 140. The suspension arm 140 is either directly or indirectly coupled to the carriage arm 105. The suspension arm 140 can be made of any of various materials, such as metals, composites, plastics, and the like.

According to some embodiments, the suspension arm 140 is directly coupled to the carriage arm 105. In such embodiments, the suspension arm 140 is non-movably fixed to the carriage arm 105. In other words, although the suspension arm 140 may flex to move portions of the suspension arm 140 relative to the carriage arm 105, the portion of the suspension arm 140 immediately affixed to the carriage arm 105 does not move relative to the carriage arm 105. The suspension arm 140 can be non-movably fixed to the carriage arm 105 via any of various coupling techniques, such as fastening, bonding, adhering, welding, and the like.

Figure 2A:
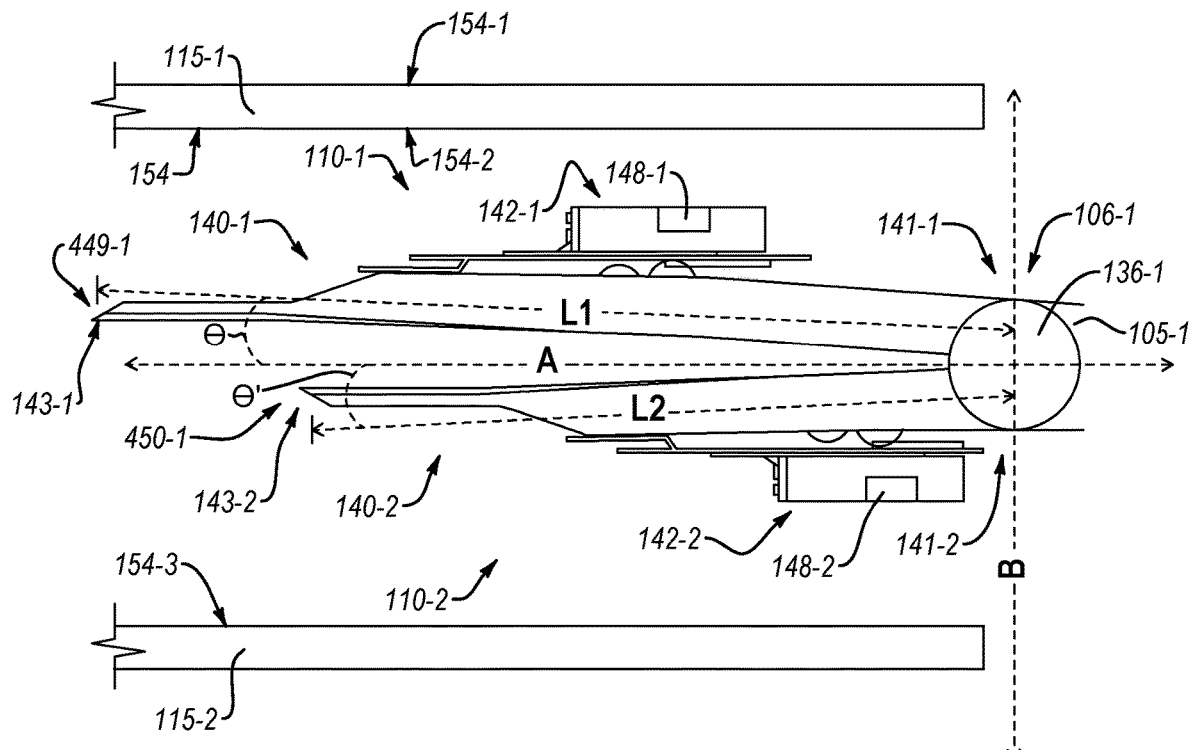
FIG. 2A is a side view of two carriage arms and two read-write head assemblies of a magnetic storage device in an unloaded position, according to one or more examples of the present disclosure.

In contrast, in some examples, the suspension arm 140 is indirectly coupled to the carriage arm 105. For example, as shown in FIG. 2A, the suspension arms 140-1 and 140-2 are coupled to the carriage arm 105-1 via a solder element 136-1, which can be a swage ball in some examples. In some examples, the suspension arm 140 is non-movably fixed to carriage arm 105 or movably fixed to the carriage arm 105. According to some implementations, the suspension arm 140 is movably fixed to the carriage arm 105 via a suspension arm actuator (not shown). The suspension arm actuator movably couples a proximal end of the suspension arm 140, and thus the entire suspension arm 140, to the distal end of the carriage arm 105. The suspension arm actuator is configured to selectively move the suspension arm 140 relative to the carriage arm 105. More specifically, as an example, the suspension arm actuator selectively rotates the suspension arm 140, and thus the slider 142 relative to the carriage arm 105, in rotational directions along a plane parallel to the read-write surface 154 of the disc 115 (e.g., plane 'A'). The suspension arm actuator can be any of various actuators known in the art, such as, for example, so-called electrically-controlled micro-actuators and milli-actuators.

Figure 2B:
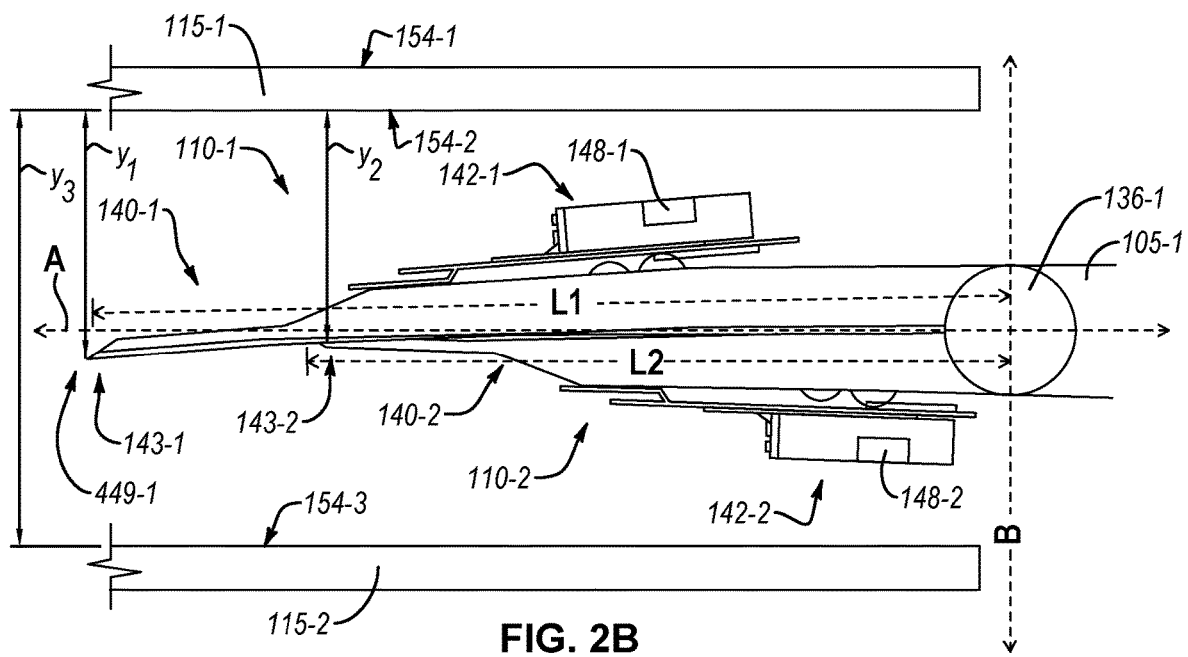
FIG. 2B is a side view of two carriage arms and two read-write head assemblies of a magnetic storage device in a loaded position, according to one or more examples of the present disclosure.
Figure 2C:
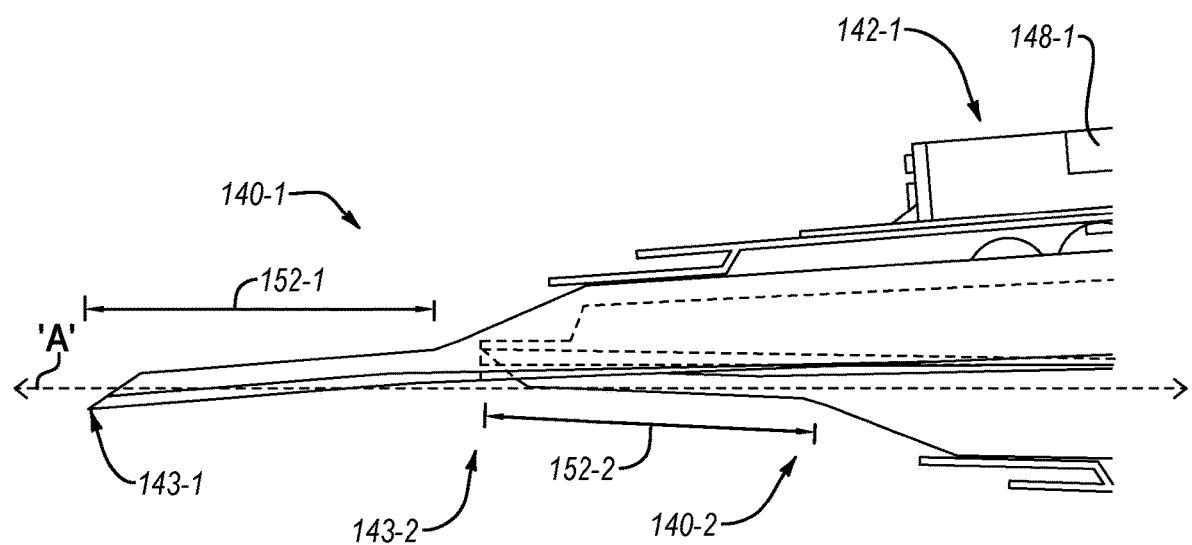
FIG. 2C is a close-up, side view of two carriage arms of a magnetic storage device in a loaded position, according to one or more examples of the present disclosure.
Figure 3:
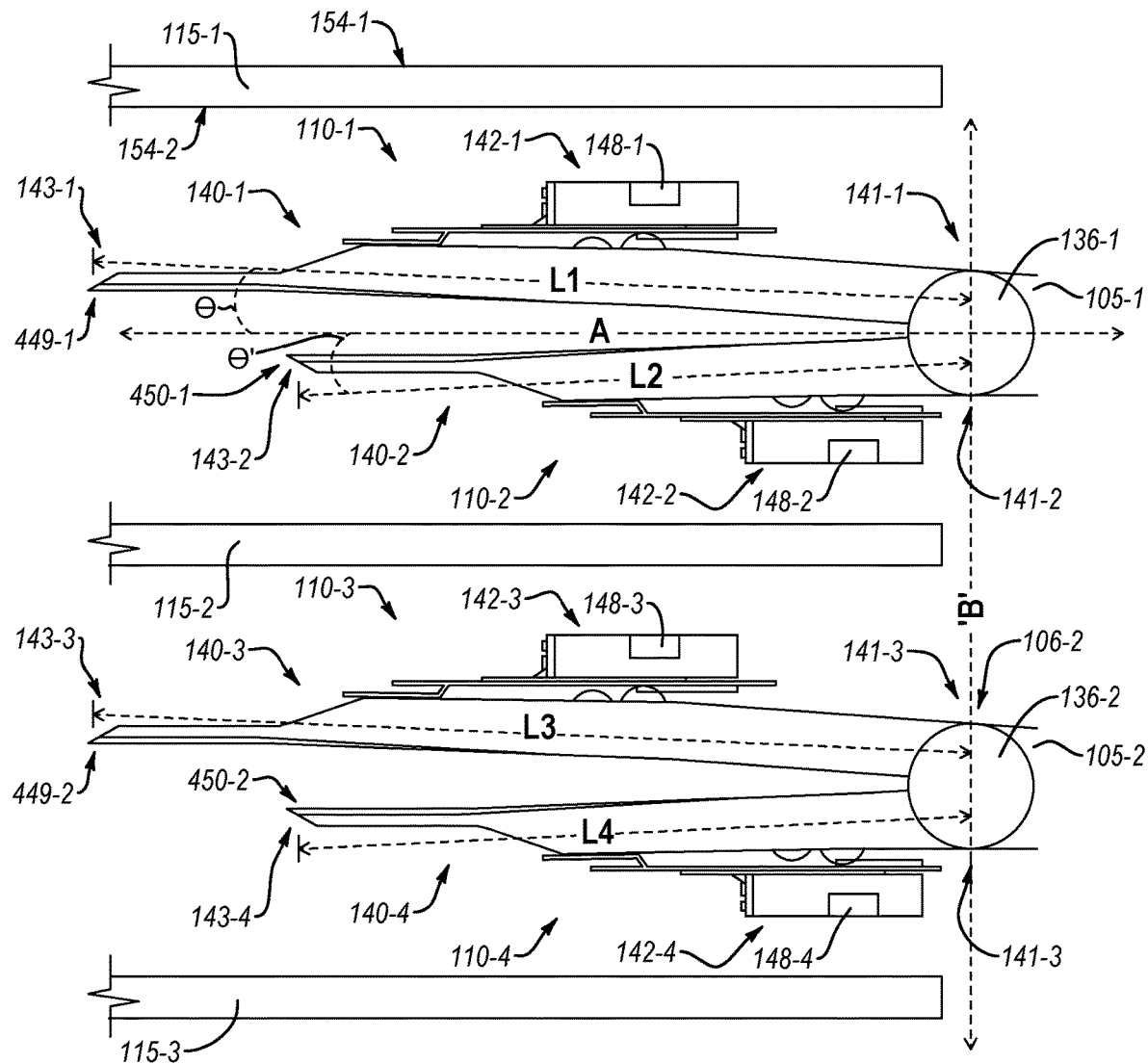
FIG. 3 is a side view of four carriage arms and four read-write head assemblies of a magnetic storage device in an unloaded position, according to one or more examples of the present disclosure.

Referring to FIGS. 2A-6, in some examples, the suspension arms 140 of the carriage 103 and/or each suspension arm 140 of a carriage arm 105 vary in length. In the illustrated examples, as shown in FIGS. 2A-3, a first suspension arm 140-1 of first a read-write head assembly 110-1 has a first length L1 that is different from a second length L2 of another suspension arm 140-2 of another read-write head assembly 110-2. Each of the suspension arms 140-1 and 140-2 are coupled to the same carriage arm 105-1. In some examples, each read/write head 148 reads data from and/or writes data to a disc 115 which it faces. In some examples, as shown in FIG. 3, the first read-write head 148-1 reads data from and writes data to the first disc 115-1. In some examples, the second read-write head 148-2, which is coupled to the same carriage arm 105-1 as the first read-write head 148-1, reads data from and/or writes data to a second disc 115-2, which the second read-write head 148-2 faces and which is adjacent to the first disc 115-1 in a stack of discs 115. Although not shown in FIG. 3, in some examples, the magnetic storage device further includes a carriage arm 105 and read-write head assembly 110 on a side of the first disc 115-1 opposite to the first read-write head assembly 110 and first read-write head 148-1. The additional read-write head assembly 110 includes an additional read-write head 148 that reads data from and/or writes data to the first disc 115-1, and the first read-write head assembly 110 is the sole read-write head assembly 110 coupled to the additional carriage arm 105. In some examples, each one of the first read-write head assembly 110-1 and the second read-write head assembly 110-2 includes a suspension tab (e.g., suspension tabs 449 and 450, respectively) and a slider (e.g., sliders 142-1 and 142-2 in FIGS. 2A and 2B).

The first length L1 being longer than the second length L2, enables the first suspension arm 140-1 and the second suspension arm 140-2 to overlap with each other, which facilitates a reduction in the space between adjacent discs 115. In some examples, as shown in FIG. 2C, a distal suspension-arm end 143-2 of the second suspension arm 140-2 passes through the plane 'A' and moves into a receptacle 170 of the first suspension arm 140-1. In some examples, the receptacle 170 is a concave portion and/or a partially hollow portion of the first suspension arm 140-1. In some examples, the receptacle 170 is on a side of the suspension arm 140 that is opposite to the slider 142. In some examples, the second suspension arm 140-2 moving into the receptacle 170 helps to reduce space between suspension arms 140-1 and 140-2 and/or between discs 115-1 and 115-2. In some examples, the suspension arm 140-2 is received by the receptacle 170 as the suspension arms 140-1, 140-2 are unloaded from the discs 115 and loaded onto a ramp support 217.

In some examples, a suspension arm 140-1 includes a proximate suspension-arm end 141-1 and a distal suspension-arm end 143-1. In some examples, the proximate suspension-arm end 141-1 is in closer proximity to the carriage arm 105-1 than the distal suspension arm end 143-1 is to the carriage arm 105-1. As shown in FIG. 2A, in some examples, the proximate suspension-arm end 141 is coupled to a distal end 106-1 of the carriage arm 105-1. Where the carriage arm 105-1 includes multiple suspension arms 140-1, 140-2, in some examples, a second suspension arm 140-2 also includes a proximate suspension-arm end 141-2 and a distal suspension-arm end 143-2. In some examples, the second proximate suspension-arm end 141-2 is also coupled to the distal end 106-1 of the carriage arm 105-1.

In some examples, as shown in FIG. 2A, the distal suspension-arm end 143-1 is in closer proximity to the read-write surface 154-2 of a disc 115-1 than the proximate suspension-arm end 141-1 is to the read-write surface 154-2 when the read-write assembly 110-1 is unloaded from the ramp support 217 and reading data from and/or writing data to the disc 115-1. As shown in FIG. 2A, in some examples, the suspension arm 140-1 is angled with respect to a plane 'A', parallel to the read-write surfaces of the discs 115-1 and 115-2 and bifurcating the space between two discs 115-1 and 115-2 such that a distal suspension arm end 143-1 is in closer proximity to the read-write surface 154-1 of the disc 115-1 than the proximate suspension arm end 141-1 is to the read-write surface 154-1 of the disc 115-1.

As used herein, a "length" of a suspension arm 140 refers to a distance between the proximate suspension arm end (e.g., proximate suspension arm end 141-1) of the suspension arm (e.g., first suspension arm 140-1) and a distal suspension arm end of the suspension arm (e.g., first distal suspension arm end 143-1 of the first suspension arm 140-1). For example, as shown in FIG. 2A, the first length L1 of the first suspension arm 140-1 extends from the proximate first-suspension-arm end 141-1 to the distal first-suspension arm end 143-1. Also, as shown in FIG. 2A, the second length L2 of the second suspension arm 140-2 adjacent to the first suspension arm 140-1 on the carriage 103 extends from the proximate second-suspension-arm end 141-2 to the distal second-suspension-arm end 143-2.

As shown in FIG. 2A, in some examples, the second length L2 of the second suspension arm 140-2 is less than the first length L1 of the first suspension arm 140-1. In some examples, a ratio of the second length L2 of the second suspension arm 140-2 to the first length L1 of the first suspension arm 140-1 is between, and inclusive of, 1 and 2. In some examples, the ratio of the second length L2 to the first length L1, or vice versa, is approximately 1.25. In some examples, the ratio of the second length L2 to the first length L1 is between and inclusive of 1 to 1.1 and 1 to 1.4, or vice versa.

In some examples, the first proximate suspension-arm end 141-1 and the second proximate suspension-arm end 141-2 of the suspension arms 140-1 and 140-2 are substantially aligned. In some examples, as shown in FIGS. 2A-3, two proximate second-suspension-arm ends 141-1 and 141-2 are aligned in a direction substantially perpendicular to read-write surfaces 154-2, 154-3 of discs 115-1 and 115-2 and/or substantially parallel to a rotational axis of the discs 115. In other words, the proximate suspension-arm ends 141-1 and 141-2 are within a plane 'B' that is substantially perpendicular to the plane 'A' and parallel to the rotational axis of the discs 115. Because the suspension arms 140-1 and 140-2 are of different lengths L1 and L2, one of the distal suspension-arm ends (e.g., 143-1) extends beyond another distal suspension-arm end (e.g., 143-2) and closer to a rotational axis of the discs 115.

In some examples, each read-write head assembly 110 includes a slider 142 and a read-write head 148. As shown in FIGS. 2A-3, in some examples, a lateral distance between an axis of rotation of the discs 115 and a first read-write head 148-1 of a first read-write head assembly 110-1 coupled to a first carriage arm 105-1 is different from a lateral distance between the axis of rotation and a second read-write head 148-2 of a second read-write head assembly 110-2 coupled to the first carriage arm 105-1. In some examples, the lateral distance between the axis of rotation and the first read-write head 148-1 is greater than the lateral distance between the axis of rotation and the second read-write head 148-2. For example, when the suspension arms 140-1 and 140-2 coupled to the first carriage arm 105-1 are loaded onto the ramp support 117, the lateral distance between the axis of rotation of the discs 115 and the first read-write head 148-1 is greater than a lateral distance between the axis of rotation of the discs 115 and the second read-write head 148-2. In some examples, the read-write heads 148-1 and 148-2 are also laterally offset from each other relative to an axis of rotation of the carriage 103. In such examples, a lateral distance between the first read-write head 148-1 and the rotational axis about which the carriage 103 rotates is greater than a lateral distance between the second read-write head 148-2 and the rotational axis about which the carriage 103 rotates.

Referring to FIGS. 2A-B, in some examples, each of the suspension arms 140-1 and 140-2 are connected to the carriage arm 105-1 via a swage elements 136-1, such as a swage ball. In some examples, each swage element 136-1 connects a proximate suspension-arm end 141-1 of a first read-write head assembly 110-1 to the first carriage arm 105-1. As shown in FIGS. 2A-B, in some examples, the swage element 136-1 connects a pair of suspension arms 140-1 and 140-2 to the first carriage arm 105-1. The pair includes two suspension arms 140-1 and 140-2 with different lengths L1 and L2.

As shown in FIG. 2A, in some examples, the plane 'A' is substantially parallel to the discs 115 and bifurcates the space between two suspension arms 140-1 and 140-2 in addition to bifurcating the space between the discs 115-1 and 115-2 when the suspension arms 140-1 and 140-2 are in an unloaded position. As used herein, "unloaded position" refers to a position in which the read-write assemblies 110 are unloaded from the ramp support 117 and the read-write heads 148 are reading data from and/or writing data to the discs 115.

In some examples, each of the suspension arms 140-1 and 140-2 are angled with respect to the plane 'A' in the unloaded position. For example, as shown in FIG. 2A, the first suspension arm 140-1 is at an angle $\theta$ with respect to the plane 'A' when the suspension arms 140-1 and 140-2 are in a loaded position. In some examples, the second suspension arm 140-2 is at an angle $\theta'$ with respect to the plane 'A' that is different from the angle $\theta$. In other examples, the second suspension arm 140-2 is angled with respect to the plane 'A' to the same degree that the first suspension arm 140-1 is angled. In some examples, each of the angles $\theta$, $\theta'$ are less than 20 degrees.

As shown in FIG. 3, in some examples, the carriage 103 includes a second carriage arm 105-2, a third read-write head assembly 110-3, and a fourth read-write head assembly 110-4. Although two carriage arms 105-1 and 105-2 and four read-write head assemblies 110-1, . . . , 110-4 are shown in FIG. 3, those of skill in the art will appreciate that examples of the present disclosure may include any number of carriage arms read-write head assemblies. In some examples, the carriage 103 includes a quantity of carriage arms equal to the quantity of discs 115 and a quantity of read-write head assemblies equal to two less than twice the quantity of carriage arms.

In some examples, the third read-write head assembly includes a third suspension arm 140-3 co-movably fixed to the second carriage arm 105-2 and having a third length L3 that extends from a proximate third-suspension-arm end 141-3 of the third suspension arm 140-3 to a distal third-suspension-arm end 143-3. In some examples, the proximate third-suspension arm end 141-3 is coupled to a distal end 106-2 of the second carriage arm 105-2. In some examples, the third read-write head assembly 110-3 also includes a third read-write head 148-3 co-movably fixed to the third suspension arm 140-3 and facing a second magnetic disc 115-2.

In some examples, the second carriage arm 105-2 is coupled to a fourth read-write head assembly 110-4. In some examples, the fourth read-write head assembly 110-4 includes a fourth suspension arm 140-4 co-movably fixed to the second carriage arm 105-2 and having a fourth-suspension arm length LA which extends from a proximate fourth-suspension arm end 141-4 coupled to a distal end 106-2 of the second carriage arm 105-2 to a distal fourth-suspension arm end 143-4 that is different from the third-suspension arm length L3. In some examples, the fourth read-write head assembly 110 includes a fourth read-write head 148-4 co-movably fixed to the fourth suspension arm 140-4 and facing a third one of the magnetic discs 115-3.

In some examples, a fourth length L4 of the fourth suspension arm 140-4 is less than the third L3. In some examples, a ratio of the third length L3 to the fourth length LA is equal to a ratio of the first length L1 to the second length L2. In some examples, the third length L3 is equal to the first length L1, and the second length L2 is equal to the fourth length LA.

As shown in FIG. 3, in some examples, each of the third suspension arm 140-3 and fourth suspension arm 140-4 are coupled at their proximate ends 143-3 and 143-4 to a distal end 106-2 of the second carriage arm 105-2 via a second solder element 136-2. In some examples, the second solder element 136-2 is coplanar with the first solder element 136-1 in the plane 'B' and/or in another plane substantially perpendicular to the discs 115. In some examples, as shown in FIG. 3, a multitude of swage elements 136-1 and 136-2 are connected to different carriage arms 105-1 and 105-2 of the carriage 103 and are substantially aligned with each other in a direction substantially perpendicular to the discs 115 and/or in the plane 'B.'

Figure 4A:
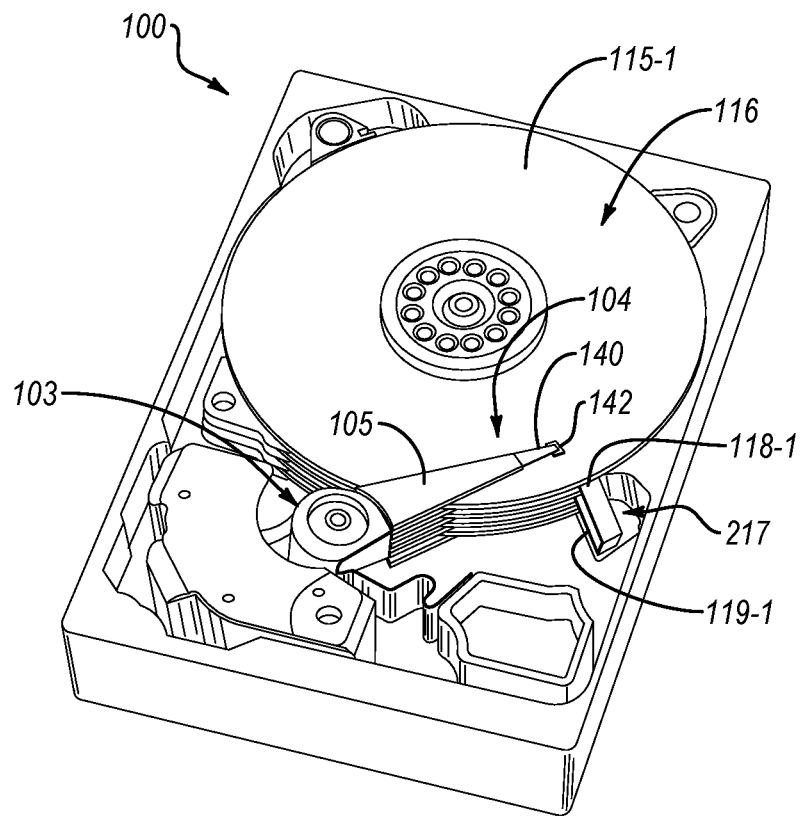
FIG. 4A is a perspective view of a magnetic storage device having a ramp support with ramps having varying dimensions from one ramp to another ramp, according to one or more examples of the present disclosure.
Figure 4B:
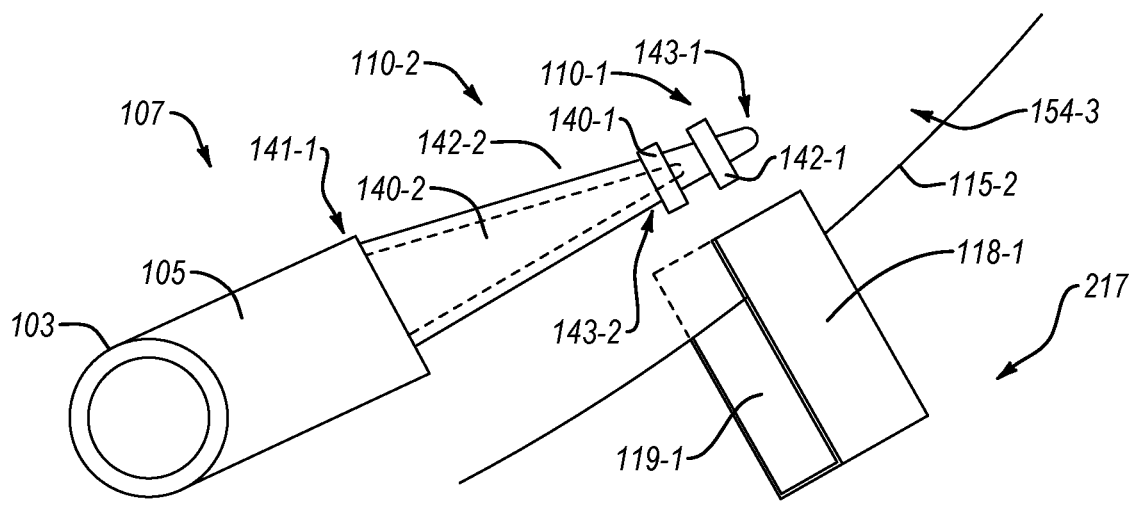
FIG. 4B is a close-up view of a magnetic storage device having a ramp support with ramps having varying dimensions from one ramp to another ramp, according to one or more examples of the present disclosure.

As shown in FIGS. 4A, 4B, and 6, the magnetic storage device 100 further comprises a ramp support 217 fixedly coupled to the base 130 of the housing 102 such that the discs 115 and the carriage 103 rotate relative to the ramp support 217. In some examples, the ramp support 217 is configured to receive the plurality of read-write head assemblies 110, which are synchronously rotated radially outward from the discs 115 into the ramp support 217. Referring to FIGS. 4A-6, which show an example of a ramp support 217 having a first ramp 118-1 and a second ramp 119-1, the ramp support 217 is one implementation of the ramp support 117 of FIG. 1.

Referring to FIGS. 4A-5B, in some examples, the carriage arm 105-1 is rotatably movable in a radial direction along one of the magnetic storage discs 115-2 and within a region radially outward from the magnetic storage discs 115 to move the suspension arms 140-1 and 140-2 and the read-write heads 148-1 and 148-2 within that region. In some examples, the radial direction is indicated by the directional arrow shown in FIG. 4B. In some examples, the radial direction is towards the ramp support 217. As such, in some examples, the suspension arms 140-1 and 140-2 are configured to move from the unloaded position shown in FIGS. 2A and 4B and are loaded onto a ramp support 217, as shown in FIGS. 2B-C and 5A-B. In some examples, the read-write heads 148-1 and 148-2 are co-movably fixed to the suspension arms 140-1 and 140-2, respectively, and move with the suspension arms 140-1 and 140-2.

Figure 5A:
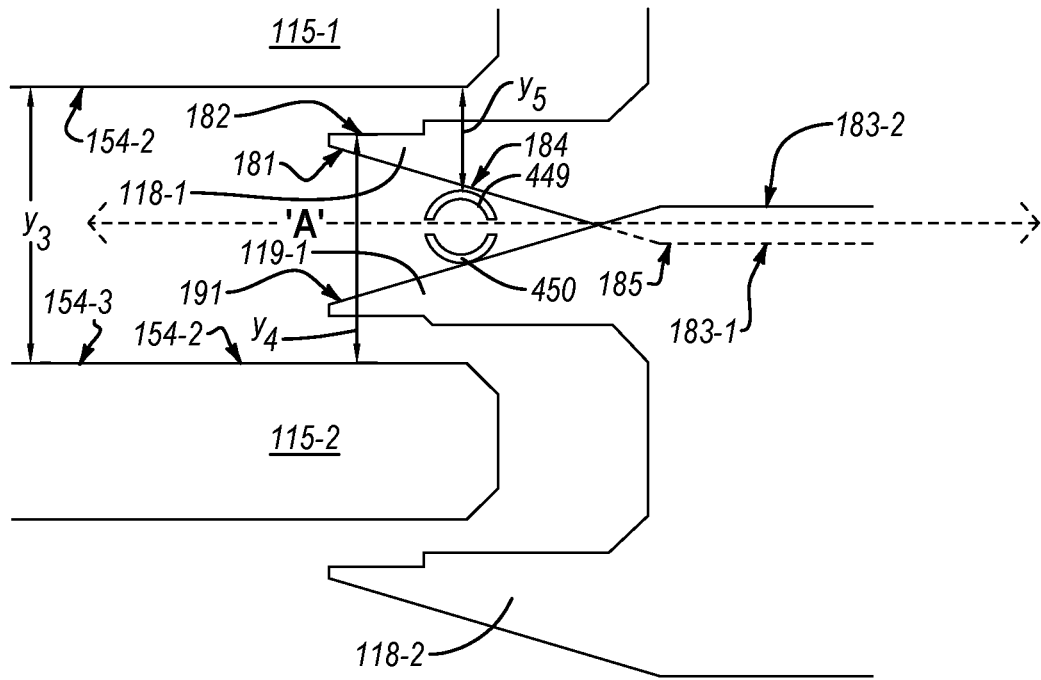
FIG. 5A is a cross-sectional side elevation view of a ramp support of a magnetic storage device, shown with a read-write head assembly in an offloaded position relative to the ramp support as the read-write head assembly is offloaded from a disc of the magnetic storage device and loaded onto the ramp support, according to one or more examples of the present disclosure.

As shown in FIGS. 4A-6, in some examples, the ramp support 217 includes a first ramp 118-1 located to receive the distal-first-suspension-arm end 143-1 when the distal-first-suspension-arm end 143-1 is moved within the region radially outward from the discs 115. In some examples, the ramp support 217 includes a second ramp 119-1 located to receive the distal-second-suspension-arm end 143-2 when the distal-second-suspension arm end 143-2 is moved within the region away from the discs 115. In some examples, the second ramp 119-1 is offset from the first ramp 118-1 in a circumferential direction along a circumference of one or more of the discs 115. In some examples, the ramp support 217 facilitates reduced space between suspension arms 140 and, thus, reduced space between discs 115 by allowing suspension arms 140-1 and 140-2 to be received by offset ramps (e.g., as shown in FIGS. 5A-6, offset ramps 118-1 and 119-1). In some examples, the differences between the first length L1 and the second length L2 help to allow the suspension arms 140-1 and 140-2 to be received by ramps 118-1 and 119-1, respectively, of the ramp support 217 that are offset from each other circumferentially, relative to the discs 115. As such, the differences in lengths L1 and L2 can help to ease spatial constraints on the ramp support 217. In some examples, the differences in lengths L1 and L2 also helps to avoid interference between the two read-write assemblies 110-1 and 110-2.

Figure 5B:
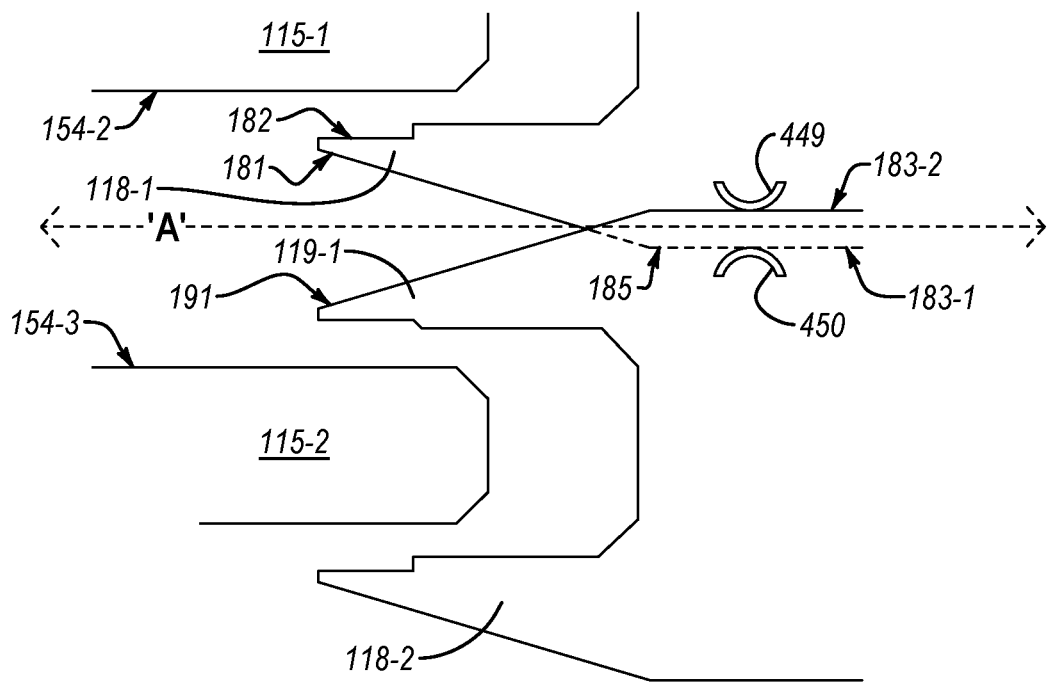

In some examples, a second-ramp surface 183-2 is located above a first-ramp surface 183-1 in a direction substantially parallel to the plane 'B' and/or perpendicular to the plane 'A.' As shown in FIGS. 2B-C and 5B, in some examples, as the suspension arms 140 are rotated radially outward from the discs 115 and moved from the unloaded position into a loaded position, at least one of the distal suspension-arm ends 143-1 and/or 143-2 passes through and/or intersects the plane 'A' and moves along the first-ramp surface 183-1 and the second-ramp surface 183-2, respectively.

As shown in FIGS. 2B-C and 5B, in some examples, the first suspension arm 140-1 also passes through the plane 'A.' As shown in FIG. 2C, in some examples, the distal second-suspension arm end 143-2 moves into the receptacle 170 as the second carriage arm 105-2 moves away from the second disc 115-2 and the second suspension arm 140-2 slides along a ramp surface of a second ramp 119-2 of the ramp support 217. Referring to FIG. 5A, in some examples, when the first suspension arm 140-1 is in a loaded position on the ramp support 217, a distance y1, in a direction substantially parallel to the plane 'B', between the first suspension arm 140-1 and a read-write surface 154-2 of the first disc 115-1 is greater than a distance y2 between the second suspension arm 140-2 and the read-write surface 154-2 of the first disc 115-1, even though the first read-write head assembly 110-1 is configured to read data from and/or write data to the first disc 115-1 when unloaded from the ramp support 217 and onto the discs 115.

Referring to FIG. 6, in some examples, the carriage 103 includes the second carriage arm 105-2, and the carriage arms 105-1 and 105-2 move together toward the ramp support 217. As such, in some examples, the suspension arms 140-3 and 140-4 move with the suspension arms 140-1 and 140-2 towards the ramp support 217. As shown in FIG. 6, in some examples, the ramp support 217 includes a multitude of paired ramps (e.g., ramps 119-1 and 118-2). In some examples, the ramp support 217 includes a third ramp 118-2 offset from a fourth ramp 119-2 in a circumferential direction along a circumference of a disc 115 (e.g, disc 115-2). In some examples, the third ramp 118-2 receives a suspension arm 140-3 of the second carriage arm 105-2 of the carriage assembly 103. In some examples, the third ramp 118-2 is substantially aligned, in a direction perpendicular to the plane 'A' and/or parallel to the plane 'B', with the first ramp 118-1. In some examples, "118" refers to ramps 118 that are substantially aligned in this direction. In some examples, "119" refer to ramps 119 that are also substantially aligned in a direction perpendicular to the plane 'A.' In some examples, each of the ramps 118-1, 118-2 are configured to receive a suspension arm 140-1, 140-3 of similar or same lengths L1 and L3. In some examples, each of the ramps 119-1, 119-2 are configured to receive other suspension arms 140-2, 140-4 that are of different lengths L2 and LA that the suspension arms 140-1, 140-3 received by the other ramps 118-1 and 118-2.

Although not shown in the Figures, in other examples, the third ramp 118-2 is aligned with the second ramp 119-1 in a direction perpendicular to the plane 'A' and/or parallel to the plane 'B' such that the both the first ramp 118-1 and the third ramp 118-2 are offset from each other in a circumferential direction along a circumference of a disc 115-2. In such examples, the second ramp 119-1 and the third ramp 118-2 are substantially aligned in a direction parallel to the plane 'B.' Moreover, in these examples, the carriage 103 includes a carriage arm having a first suspension arm 140 to be received by the first ramp 118-1 and a second suspension arm 140 of a second length configured to be received by the second ramp 119-1. In some examples, the carriage 103 includes a second carriage arm 105 having a third suspension arm 140 configured to be received by the third ramp 118-2. In some examples, the third suspension arm 140 is of the second length and/or a length close to the second length.

In some examples, the read-write assemblies 110 include suspension tabs at distal suspension arm ends. Referring to FIGS. 2A-B, a first suspension arm 140-1 includes a first suspension tab 449-1 at the distal end 143-1. Herein, the suspension tab of a first read-write head assembly of a carriage arm may be referred to as "first suspension tab" (e.g., first suspension tab 449-1). Similarly, the suspension tab of a second read-write head assembly of the carriage arm may be referred to herein as "second suspension tab" (e.g., second suspension tab 450-1). In some examples, the first suspension tab 449-1 is the suspension tab of a read-write head assembly 110-1 on a first side of a carriage arm 105-1, and the second suspension tab 450-1 is the suspension tab of a read-write head assembly 110-2 on an opposite side of the carriage arm 105-1. In some examples, the first suspension tab 449-1 and the second suspension tab 450-1 are flexible with respect to the carriage arm(s) 105. In some examples, the first suspension tab 449-1 is a suspension tab of a suspension arm 140-1 that is longer than a second suspension arm 140-2, and the second suspension tab 450-1 is a suspension of the second suspension arm 140-2. As shown in FIGS. 2A-3, in some examples, the suspension tabs 449-1, 450-1 are each defined by a distal end 143 of a suspension arm 140. Referring to FIG. 3, in some examples, the third read-write head assembly 110-3 and the fourth read-write head assembly 110-4 also include suspension tabs 449-2 and 450-2, respectively. Although not shown in FIG. 3, in some examples, the carriage 103 includes more than two carriage arms 105-1, 105-2, and each read-write head assembly 110 includes at least one suspension tab 449, 450.

In some examples, the suspension tabs 449 and 450 facilitate loading of the read-write head assembly 110 onto the ramp support. In some examples, suspension tabs 449-1 and 450-2 of read-write head assemblies 110-1 and 110-2 fit into a space between and slide along a corresponding one of a first ramp 118-1 and a second ramp 119-1 of the ramp support 117. In some examples, the first ramp 118-1 and the second ramp 119-1 guide the suspension tabs 449, 450 as they move radially outward relative to the discs 115 so that the read-write heads 148 corresponding with the suspension tabs 449, 450 are moved into a parked position associated with the magnetic storage device 100 being in an idle state (or a "loaded" position, as referred to herein).

In some examples, a suspension tab 449, 450 includes a curved portion of the distal suspension-arm end 143, and a concave side of the suspension tab faces a concave side of a suspension tab of an adjacent suspension arm 140 when the suspension arms 140 are in an unloaded position. For example, as shown in FIG. 5A, the first suspension arm 140-1 includes a suspension tab 449-1 at the first suspension-arm distal end 143-1. In some examples, the second suspension arm 140-2 includes a second suspension tab 450-1 at the second suspension-arm distal end 143-2. In some examples, the concave sides of the suspension tabs 449, 450 face each other when the suspension arms 140-1 and 140-2 are unloaded from the ramp support 117 and/or during initial stages of loading the suspension arms 140-1 and 140-2 onto the ramp support 117. In some examples, the convex sides of the suspension tabs 449, 450 contact the ramps 118, 119 as the suspension arms 140 are loaded onto the ramp support 117.

In some examples, each suspension arm 140-1 and 140-2 includes a ramp contact portion 152-1, 152-2 (referred to herein, individually and/or collectively, as "152") that includes the suspension tabs 449-1 and 450-1 and contacts a ramp 118-1, 119-1 when the carriage arm 105-1 is rotated radially outward from the discs 115. In some examples, when the carriage arm 105-1 is rotated radially outward from the discs 115, a first suspension arm ramp contact portion 152-1 of the first suspension arm 140-1 contacts the first ramp 118-1. In such examples, when the carriage arm 105-1 is rotated radially outward from the discs 115, a second suspension arm ramp contact portion 152-2 of the second suspension arm 140-2 contacts the second ramp 119-1. In some examples, two adjacent ramp contact portions 152-1 and 152-2 are laterally offset from each other with respect to the solder element 136-1.

As shown in FIGS. 5A-6, the first ramp 118-1, in some examples, includes a first first-ramp surface 181, which contacts the first suspension arm ramp contact portion 152-1 when the first carriage arm 105-1 is moved radially outward from the disc 115-1. For example, as shown in FIG. 5A, the first suspension tab 449 contacts the first first-ramp surface 181. In some examples, the second ramp 119-2 includes a first second-ramp surface 191 that contacts the second suspension arm ramp contact portion 152-2 when the first carriage arm 105-1 is moved radially outward from the disc 115-1. For example, the second suspension tab 450 contacts the second-ramp surface 191. In some examples, the first-ramp surface 181 and the second-ramp surface 191 are surfaces of consecutive ramps 118-1, 119-1 of the ramp support 217, in a direction substantially perpendicular to the plane 'A' and/or substantially parallel to the plane 'B.'

Examples of the present disclosure can help to reduce space between discs 115. As such, in some examples, the magnetic storage device 100 includes eleven or more discs 115. In some examples, a distance y3, in a direction substantially parallel to the axis of rotation of the discs 115 and/or to the plane 'B', between two discs 115 (e.g., the first disc 115-1 and the second disc 115-2), is less than or equal to 1.55 centimeters ("cm").

In some examples, the first ramp 118-1 includes a second first-ramp surface 182 opposite to the first first-ramp surface 181. In some examples, a distance y4, in a direction parallel to the axis of rotation of the discs 115 and/or to the plane 'B', between the second first-ramp surface 182 and a read-write surface 154-2 of the second disc 115-2 is greater than or equal to half of a distance y3, in the direction, between the read-write surface 154-2 and a read-write surface 154-1 of the first disc 115-1.

In some examples, the first first-ramp surface 181 includes a point of contact 184 between the first read-write head assembly 110-1 (e.g., the suspension tab 449-1 and/or ramp contact portion 152-1) and the first first-ramp surface 181 when the first carriage arm 105-1 is rotated radially outward form the discs 115. In some examples, the point of contact 184 is the first point along the first first-ramp surface 181 that the first suspension tab 449-1 contacts. In some examples, a distance y5 between the first point of contact 184 and the second-disc surface 154-2 is not less than 0.1 cm. In some examples, the first ramp 118-1 also includes a third first-ramp surface 183 connected to the first first-ramp surface 181 at a second point of contact 185. In some examples, a distance, in a direction parallel to the axis of rotation of the discs 115 and/or to the plane 'B', between the first point of contact 184 and the second point of contact 183 is not less than 0.2 cm. In some examples, the first first-ramp surface 181 is angled with respect to the third first-ramp surface 183. In some examples, the first first-ramp surface 181 is angled with respect to the second first-ramp surface 182.

FIG. 7 is a flow chart illustrating a method 700 of loading suspension arms 140 onto a ramp support 217. In some examples, the method 700 includes rotating a first carriage arm 105-1 radially outward from a first magnetic disc 115-1 and toward a ramp support 217. In some examples, the method 700 includes causing 702 a first suspension arm 140-1, co-movably fixed to the first carriage arm 105-1 and having a first length L1 that extends from a proximate first-suspension-arm end 143-1 of the first suspension arm 140-1 to a distal first-suspension-arm end 143-1 of the first suspension arm 140-1, to move toward and contact a first-ramp surface (e.g., first first-ramp surface 181) of a first ramp 118 of the ramp support 217. In some examples, the method 700 also includes causing the first suspension arm 140-1 to move along the first-ramp surface 181 until the distal first-suspension-arm end intersects the plane 'A' between the proximate first-suspension-arm end 143-1 and a proximate second-suspension-arm end 143-2 of a second read-write head assembly 110-2.

In some examples, the method 700 also includes causing 704 a second suspension arm 140-2 of the second read-write head assembly 110-2 to move toward and contact a second-ramp surface 191 of the second ramp 119 of the ramp support 217. In some examples, the second suspension arm 140-2 is co-movably fixed to the first carriage arm 105-1 and has a second length L2 that extends from a proximate second-suspension arm end 141-2 to a distal second-suspension arm end 143-2 of the second suspension arm 140-2 different from the first length L1. In some examples, the method 700 includes performing the steps 702 and 704 of causing the first suspension arm 140-1 to move and causing the second suspension arm 140-2 to move simultaneously (e.g., while rotating the carriage arm 105-1).

In some examples, the method 700 includes causing the distal first-suspension arm end 143-1 to move, in a direction substantially parallel to the axis of rotation of the first carriage arm 105-1 and/or to the plane 'B', from a first side of the distal second-suspension arm end 143-2 to a second side of the distal second-suspension arm end 143-2 opposite to the first side. In some examples, the rotating of the carriage arm 105-1 further causes each of the distal-first-suspension-arm end 143-1 and the distal-second-suspension-arm end 143-2 to intersect or pass through a first plane 'A' bifurcating the space between two discs 115-1 and 115-2.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disc, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
   magnetic storage discs;
   a carriage, comprising:
      a first carriage arm rotatably movable in a radial direction along a first one of the magnetic storage discs and within a region radially outward from the first one of the magnetic discs;
      a first read-write head assembly, comprising:
         a first suspension arm co-movably fixed to the first carriage arm and having a first-suspension-arm length extending from a proximate first-suspension-arm end of the first suspension arm to a distal first-suspension-arm end of the first suspension arm, wherein the proximate first-suspension-arm end is coupled to a distal end of the first carriage arm; and
         a first read-write head co-movably fixed to the first suspension arm and facing the first one of the magnetic discs; and
      a second read-write head assembly, comprising:
         a second suspension arm co-movably fixed to the first carriage arm and having a second-suspension arm length extending from a proximate second-suspension arm end to a distal second-suspension arm end of the second suspension arm that is different from the first-suspension arm length, wherein the proximate second-suspension arm end is coupled to the distal end of the first carriage arm; and
         a second read-write head co-movably fixed to the second suspension arm and facing a second one of the magnetic discs; and
   a ramp support, comprising:
      a first ramp located to receive the distal-first-suspension-arm end when the distal-first-suspension-arm end is moved within the region and away from the magnetic discs; and
      a second ramp offset from the first ramp in a circumferential direction along a circumference of the first one of the discs and located to receive the distal-second-suspension-arm end when the distal-second-suspension-arm end is moved within the region and away from the magnetic discs,
   wherein the distal-first-suspension-arm end and the distal-second-suspension-arm end intersect or pass through a first plane bifurcating the space between the first disc and the second disc and being parallel to the discs when the distal-first-suspension-arm end and the distal-second-suspension-arm end move onto the ramp support.

2. The magnetic storage device according to claim 1, wherein the first plane passes through a first-ramp portion of the first ramp and a second-ramp portion of the second ramp.

3. The magnetic storage device according to claim 2, wherein:
   the first ramp comprises a first-ramp surface that contacts the first suspension arm when the first carriage arm is moved radially outward from the disc;
   the second ramp comprises a second-ramp surface that contacts the second suspension arm when the first carriage arm is moved radially outward from the disc; and
   the first-ramp surface and the second-ramp surface are consecutive ramp surfaces of the ramp support, in a direction perpendicular to the first plane.

4. The magnetic storage device according to claim 1, further comprising:
   a swage ball connecting the proximate first-suspension-arm end of the first read-write head assembly to the first carriage arm and connecting the proximate second-suspension-arm end of the second read-write head assembly to the first carriage arm.

5. The magnetic storage device according to claim 1, wherein the ramp support further comprises a third ramp aligned with the first ramp in a direction perpendicular to the first plane such both the first and third ramps are offset from each other in a circumferential direction along a circumference of a third one of the discs.

6. The magnetic storage device according to claim 1, wherein:
   the second-suspension arm length is less than the first-suspension arm length; and
   the proximate first-suspension arm end is aligned with the proximate second-suspension-arm end in a direction perpendicular to the first plane.

7. The magnetic storage device according to claim 1, wherein a ratio of the second-suspension arm length to the first-suspension arm length is between, and inclusive of, 1 and 2.

8. The magnetic storage device according to claim 1, wherein each of the first suspension arm and the second suspension arm extends at an angle relative to the first plane.

9. The magnetic storage device according to claim 1, wherein:
   the first suspension arm comprises a receptacle; and
   the distal second-suspension arm end moves into the receptacle as the first carriage arm moves away from the second disc and the second suspension arm slides along a ramp surface of the second ramp.

10. The magnetic storage device according to claim 1, the carriage further comprising:
   a second carriage arm;
   a third read-write head assembly, comprising:
      a third suspension arm co-movably fixed to the second carriage arm and having a third-suspension arm length extending from a proximate third-suspension-arm end of the third suspension arm to a distal third-suspension-arm end, wherein the proximate third-suspension arm end is coupled to a distal end of the second carriage arm; and
      a third read-write head co-movably fixed to the third suspension arm and facing the second one of the magnetic discs; and
   a fourth read-write head assembly, comprising:
      a fourth suspension arm co-movably fixed to the second carriage arm and having a fourth-suspension arm length extending from a proximate fourth-suspension-arm end to a distal fourth-suspension-arm end that is different from the third-suspension arm length, wherein the proximate fourth-suspension-arm end is coupled to the distal end of the second carriage arm; and
      a fourth read-write head co-movably fixed to the fourth suspension arm and facing a third one of the magnetic discs.

11. The magnetic storage device of claim 1, wherein the magnetic storage device comprises at least eleven magnetic discs.

12. The magnetic storage device of claim 1, wherein a lateral distance between an axis of rotation of the magnetic discs and the first read-write head is greater than a lateral distance between the axis of rotation and the second read-write head.

13. The magnetic storage device of claim 1, wherein a distance, in a direction substantially parallel to an axis of rotation of the magnetic discs, between the first disc of the magnetic disc and the second disc of the magnetic discs, is less than or equal to 1.55 centimeters ("cm").

14. The magnetic storage device of claim 13, wherein: the first ramp comprises:
    a first first-ramp surface configured to contact the first read-write head assembly when the first carriage arm is rotated radially outward from the disc; and
    a second first-ramp surface opposite to the first first-ramp surface; and
    a distance, in the direction, between the second first-ramp surface and a second-disc surface of the second disc is greater than or equal to half of a distance, in the direction, between the second-disc surface and a first disc surface of the first disc facing the second-disc surface.

15. The magnetic storage device of claim 14, wherein the first first-ramp surface comprises a first point of contact between the first read-write head assembly and the first first-ramp surface when the first carriage arm is rotated radially outward from the discs, wherein a distance between the first point of the contact and the second-disc surface is not less than 0.1 cm.

16. The magnetic storage device of claim 15, wherein the first ramp further comprises a third first-ramp surface connected to the first-ramp surface at a second point of contact, wherein:
    a distance, in the direction, between the second point of contact and the first point of contact, is not less than 0.2 cm; and
    the first first-ramp surface is angled with respect to the third first-ramp surface and the second first-ramp surface.

17. A carriage for a magnetic storage device, comprising:
    a first carriage arm;
    a first read-write head assembly, comprising:
        a first suspension arm co-movably fixed to the first carriage arm and having a first-suspension-arm length extending from a proximate first-suspension-arm end of the first suspension arm to a distal first-suspension-arm end of the first suspension arm, wherein the proximate first-suspension-arm end is coupled to a distal end of the first carriage arm; and
        a first read-write head co-movably fixed to the first suspension arm and coupled to the distal first-suspension-arm end; and
    a second read-write head assembly, comprising:
        a second suspension arm co-movably fixed to the first carriage arm and having a second-suspension arm length extending from a proximate second-suspension arm end to a distal second-suspension arm end of the second suspension arm that is different from the first-suspension arm length, wherein the proximate second-suspension arm end is coupled to the distal end of the first carriage arm; and
        a second read-write head co-movably fixed to the second suspension arm.

18. A method comprising:
    rotating a first carriage arm radially outward from a first magnetic disc and toward a ramp support, wherein rotating the carriage arm radially outward from the magnetic disc causes:
        a first suspension arm co-movably fixed to the first carriage arm and having a first-suspension arm length extending from a proximate first-suspension-arm end of the first suspension arm to a distal first-suspension-arm end of the first suspension arm, to:
            move toward and contact a first-ramp surface of a first ramp of the ramp support; and
            move along the first-ramp surface until the distal first-suspension-arm end intersects a first plane between the proximate first-suspension-arm end and a proximate second-suspension-arm end of a second read-write head assembly; and
        a second suspension arm of the second read-write head assembly to move toward and contact a second-ramp surface of a second ramp of the ramp support,
    wherein:
        the second suspension arm is co-movably fixed to the first carriage arm and has a second-suspension arm length extending from a proximate second-suspension arm end to a distal second-suspension arm end of the second suspension arm different from the first-suspension arm length.

19. The method according to claim 18, wherein rotating the first carriage arm further causes the distal first-suspension arm end to move, in a direction substantially parallel to an axis of rotation of the first carriage arm, from a first side of the distal second-suspension-arm end to a second side of the distal second-suspension-arm end opposite to the first side.

20. The method according to claim 18, wherein rotating the first carriage arm further causes each of the distal-first-suspension-arm end and the distal-second-suspension-arm end to intersect or pass through a first plane bifurcating a space between the first disc and a second disc.

* * * * *